UNITED STATES PATENT OFFICE.

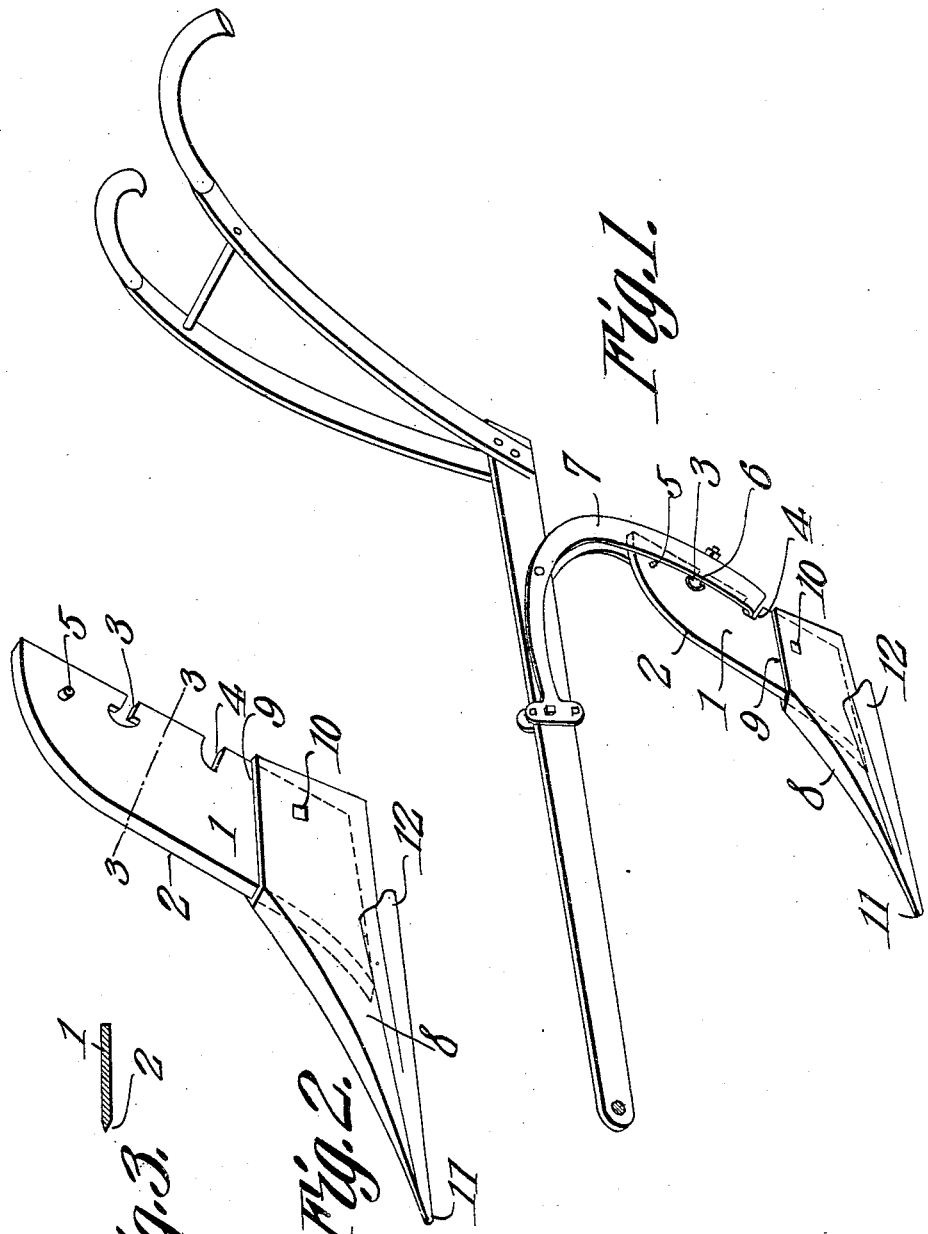

BENJAMIN T. BETHUNE, OF MILLEDGEVILLE, GEORGIA.

PLOW.

941,224.

Specification of Letters Patent.  Patented Nov. 23, 1909.

Application filed February 19, 1909. Serial No. 478,847.

*To all whom it may concern:*

Be it known that I, BENJAMIN T. BETHUNE, a citizen of the United States, residing at Milledgeville, in the county of Baldwin and State of Georgia, have invented a new and useful Plow, of which the following is a specification.

This invention has relation to plows, and it consists in the novel construction and arrangement of its parts, as hereinafter shown and described.

The object of the invention is to provide a plow which may readily be attached to the standard of an ordinary plow stock and which may be used for advantage for sub-soil purposes; also for cutting sod and roots, and for cutting roots and stalks which may be located below the surface of the soil without unnecessarily disturbing the soil's surface or plants growing thereat.

With the above objects in view the plow consists primarily of a plate having peculiar means whereby it may be attached to the plow standard, and a detachable share or point adapted to be applied to the said plate.

In the accompanying drawings:—Figure 1 is a perspective view of a stock with the plow attached thereto. Fig. 2 is a perspective view of the plow. Fig. 3 is a sectional view of a plate used in the plow, cut on the line 3—3 of Fig. 2.

The plow consists of the plate 1, which is relatively long with respect to its breadth, and comparatively thin. The said plate is provided with a forward cutting edge 2, and is provided at its rear edge with a recess 3, which in turn possesses an enlarged inner end and extends inwardly from the rear edge of the said plate. A notch 4 is located in the rear edge of the plate 1, below the recess 3, and a cross-pin 5 passes transversely through the upper portion of the said plate and projects at its ends beyond the planes of the sides thereof. The recess 3 and the enlarged inner end thereof is adapted to receive the head of a keel bolt 6, which is adapted to be secured to the plow standard 7 in the usual manner, and, when so positioned, the end portions of the pin 5 bear against the front edges of the said standard 7, while the notch 4 receives the lower end of the standard.

A share or point 8 is adapted to be attached to the lower portion of the plate 1, and is provided with a slot or recess 9 for the reception of the lower portion of the said plate 1, and is secured thereto by means of a bolt 10, which passes transversely through the side portions of the said share 8 and the lower portion of the plate 1. The share 8 is pointed at its forward end as at 11, and is provided with the laterally disposed pointed wing portions 12, the edges of which converge toward the point 11.

From the above description it is obvious that a plow is provided which may be used advantageously for sub-soil purposes, in that the cutting edge 2 of the plate 1 will make an incision in the top soil, while the share or point 8 will cut out and irrigate the sub-soil, without unnecessarily disturbing the top soil.

It will also be seen that by removing the share or point 8 the blade 1 may be used as a root-cutter or sod-cutter, and that when so used it does not disturb the surface of the soil or the plants located at the surface.

Further it will be observed that the parts, when worn, or fractured, may be readily renewed and interchanged at will.

Having described my invention, what I claim as new, and desire to secure, by Letters Patent, is:—

In combination with a plow having a standard with spaced sides, a plate having in its rear edge a notch for the reception of the lower portion of the standard, said plate also having in its rear edge a recess with an enlarged inner end, a pin passing transversely through the plate and having end portions projecting beyond the planes of the sides of the plate and adapted to bear against the front edges of the sides of the standards, a detachable bolt having a head adapted to rest in the enlarged portion of the recess, said bolt adapted to pass through the space between the sides of the standard, means for securing the bolt to the standard and a share detachably mounted upon the lower portion of the plate.

In testimony that I claim the foregoing as my own, I have hereto affixed my signature in the presence of two witnesses.

BENJAMIN T. BETHUNE.

Witnesses:
R. M. FLETCHER,
T. B. DUMAS.